United States Patent [19]
Gordon et al.

[11] 3,890,341
[45] June 17, 1975

[54] METHOD OF PREPARING DI 6-PHENYL-2,3,5,6-TETRAHYDRO-IMIDAZO[2,1-B]THIAZOLE AND ACID ADDITION SALTS THEREOF

[75] Inventors: John Edson Gordon, Martinsville; Imre Aurel Halmos, Summit, both of N.J.

[73] Assignee: American Cyanamid Company, Stamford, Conn.

[22] Filed: June 18, 1973

[21] Appl. No.: 371,229

[52] U.S. Cl. .................... 260/306.7 T; 260/240 D
[51] Int. Cl. ........................................... C07d 99/10
[58] Field of Search ............................ 260/306.7 T

[56] References Cited
UNITED STATES PATENTS
3,708,490   1/1973   Spicer et al. ................. 260/306.7 T OTHER PUBLICATIONS
Wagner et al., Synthetic Organic Chemistry, Wiley, N.Y., 1953, pp. 89–91.

*Primary Examiner*—R. Gallagher
*Attorney, Agent, or Firm*—E. Y. Miller

[57] ABSTRACT

A method of preparing di 6-phenyl-2,3,5,6-tetrahydroimidazo[2,1-b]thiazole (tetramisole) and acid addition salts thereof, by reacting di 3-($\beta$-hydroxyphenethyl)-2-iminothiazolidine with a highly concentrated aqueous hydrochloric acid at moderately elevated temperatures to obtain the di 3-($\beta$-chlorophenethyl)-2-iminothiazolidine acid-addition salt, converting the latter compound to *di* 6-phenyl-2,3,5,6-tetrahydroimidazo[2,1-b]thiazole which is converted to di 6-phenyl-2,3,5,6-tetrahydroimidazo[2,1-b]thiazole acid addition salt in a highly purified state. The products are useful as anthelmintics.

9 Claims, No Drawings

METHOD OF PREPARING DL 6-PHENYL-2,3,5,6-TETRAHYDRO-IMIDAZO(2,1-B)THIAZOLE AND ACID ADDITION SALTS THEREOF

FIELD OF THE INVENTION

This invention relates to a method of preparing dl 6-phenyl-2,3,5,6-tetrahydroimidazo[2,1-b]thiazole, also known as dl tetramisole, acid addition salts thereof, and methods of preparing intermediates therefor.

The dl 6-phenyl-2,3,5,6-tetrahydroimidazo[2,1-b]thiazole prepared by the process of the present invention can be illustrated by the following formula:

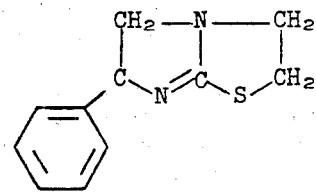

DESCRIPTION OF THE PRIOR ART

The preparation of dl 6-phenyl-2,3,5,6-tetrahydroimidazo[2,1-b]thiazole hydrochloride, also known as dl tetramisole hydrochloride, is disclosed by Bullock in U.S. Pat. No. 3,679,696 as outlined in Flowsheet 1.

In the prior art process of U.S. Pat. 3,679,696 dl 3-(β-hydroxyphenethyl)-2-iminothiazolidine is prepared as a salt compound (III) hereinafter by reacting 2-phenyl-1-aziridine-ethanol compound (I) with at least one molar equivalent of thiocyanic acid and treatment of the resulting 2-[β-hydroxyphenethyl)amino]ethyl thiocyanate compound (II) with a strong acid such as hydrochloric acid. The thiocyanic acid is usually prepared in situ by the acidification of an ammonium or metal thiocyanate salt, preferably sodium or potassium thiocyanates.

FLOWSHEET 1

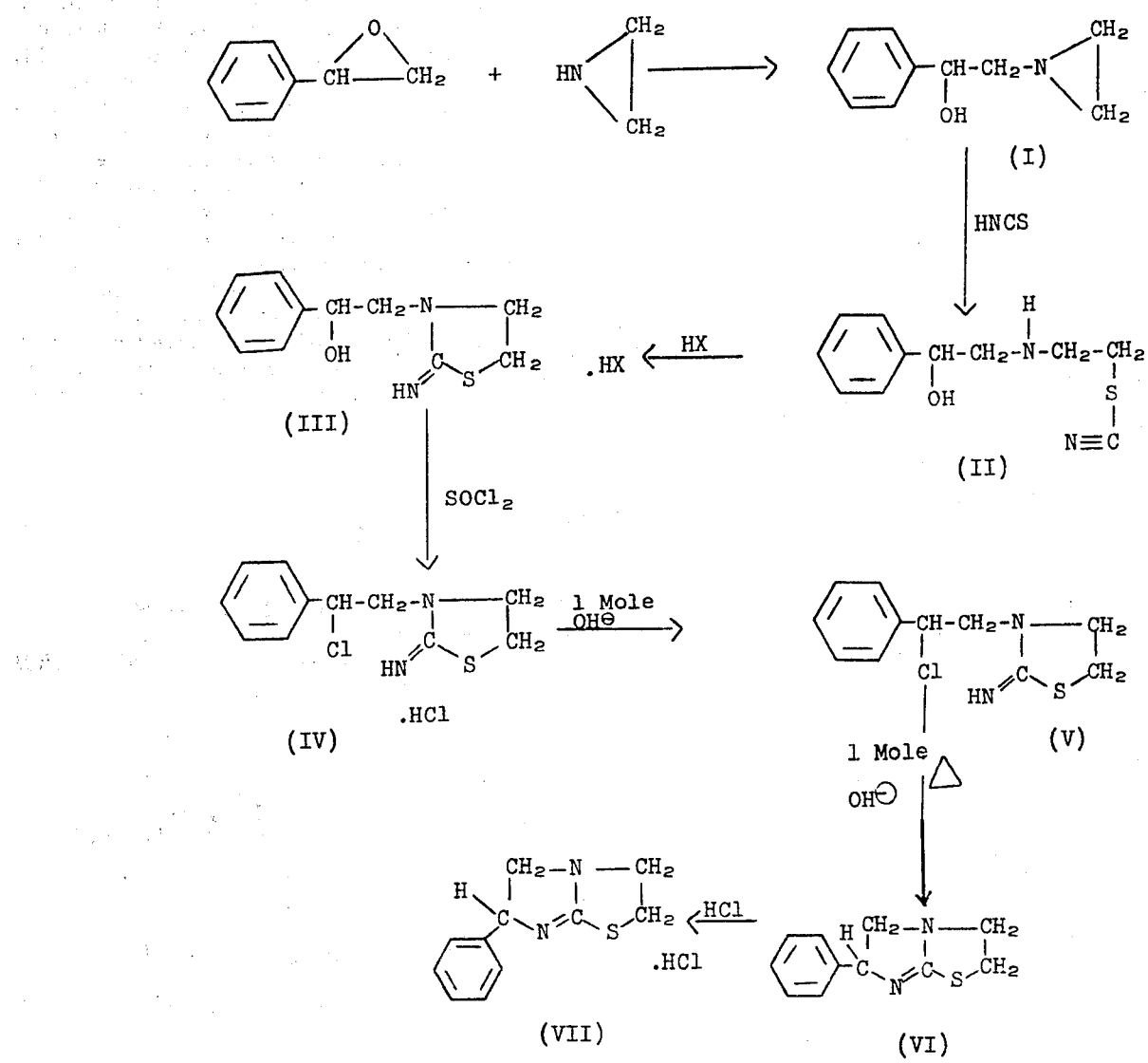

The 2-phenyl-1-aziridineethanol compound (I) of Flowsheet 1 can be prepared by reacting styrene oxide with ethyleneimine as described by Funke et al., Bull. Soc. Chim., France, 1953 (12013), and more recently by Baklien et al., Aust. J. Chem. 1968, 21, (6) 1557–70.

The preparation of dl 3-(β-chlorophenethyl)-2-iminothiazolidine compound (IV) by the reaction of dl 3-(β-hydroxyphenethyl)-2-iminothiazolidine acid addition salts compound (III) with a phosphorus halide, for example, phosphorus trichloride, phosphorus tribromide, or phosphorus pentachloride, or a phosphorus oxyhalide, for example, phosphorus oxychloride, or thionyl chloride in a non-hydroxylic solvent, such as ethylene dichloride, is disclosed in U.S. Pat. Nos. 3,478,047, 3,642,809 and 3,679,725. The thus prepared halogeno compound is subjected, preferably in situ, in the non-hydroxylic solvent to a suitable base, for example, an alkali metal hydroxide or carbonate to effect the cyclization to dl 6-phenyl-2,3,5,6-tetrahydroimidazo[2,1-b]thiazole. The overall yield from compound (III) to dl tetramisole hydrochloride compound (VII) by this process is about 88%. However, this process has a disadvantage in that an undesirable impurity, trans-2-imino-3-styrylthiazolidine, which has the formula (VIII) is produced.

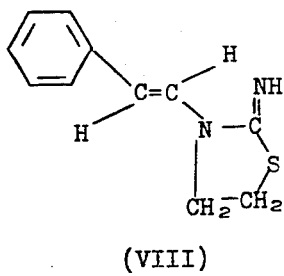

(VIII)

The hydrochloride salt of compound VIII, hereafter referred to as the styryl impurity, is toxic. Since the latter compound can be present in the final product in amounts up to about 5 percent by weight further purification of the final product is required. This requires a complicated isolation process which greatly increases the cost of the final product.

SUMMARY OF THE INVENTION

We have now found that by reacting dl 3-(β-hydroxyphenethyl)-2-iminothiazolidine or acid-addition salts as in compound (III), with highly concentrated hydrochloric acid at moderate temperatures, the dl 3-(β-chlorophenethyl)thiazolidine acid-addition salt thus obtained can be converted by the action of base into dl 6-phenyl-2,3,5,6-tetrahydroimidazo[2,1-b]thiazole compound (VI) in practically theoretical overall yield. The latter compound can be isolated from the reaction mixture in almost quantitative yield in high purity as an acid-addition salt, such as the hydrochloride.

The process of the present invention is similar to that described in Flowsheet 1 up to and including the formation of (III), the acid addition salt of dl 3-(β-hydroxyphenethyl)-2-iminothiazolidine.

The preparation of dl tetramisole hydrochloride from compound (III) by the process of this invention is outlined in Flowsheet 2. In the aforementioned flowsheet HX is defined as an acid capable of forming an addition salt with the free base of compound (III). Illustrative of such acids are hydrochloric, hydrobromic, sulfuric, oxalic, p-toluenesulfonic, and the like. The thiocyanic acid addition salt of the free base of compound (III) cannot be used in this process. While it is preferable to start with compound (III), it is obviously possible to utilize the free base of compound (III) dl 3-(β-hydroxyphenethyl)-2-iminothiazolidine, as the starting material since it will be immediately converted to the hydrochloride in the reaction mixture.

According to the method of this invention, highly concentrated aqueous hydrochloric acid is used as a reactant to convert dl 3-(β-hydroxyphenethyl)-2-iminothiazolidine, or the acid-addition salt thereof, to dl 3-(β-chlorophenethyl)-2-iminothiazolidine acid-addition salt. As concentrated hydrochloric acid commercially available hydrochloric acid of 36–38 percent (22° Be)

FLOWSHEET 2

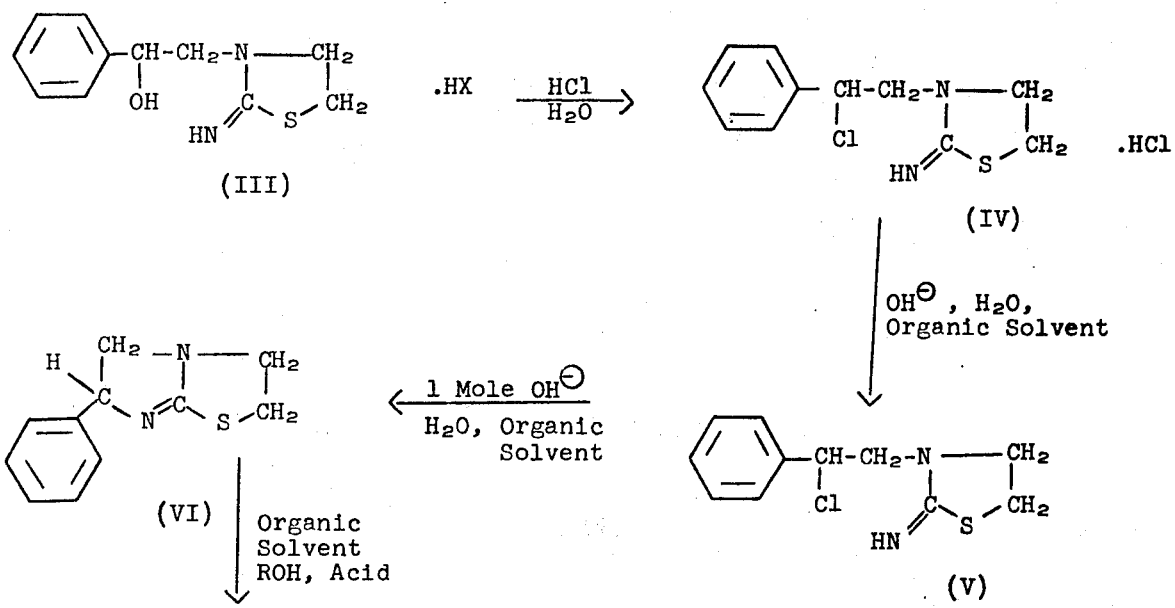

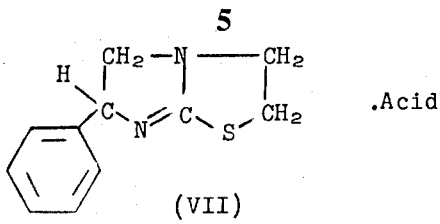

(VII)

may be used. However, in the preferred embodiment of this invention aqueous hydrochloric acid solutions of concentrations higher than 36–38 percent are used.

In the process of this invention, the chlorination of compound (III) is carried out in an aqueous system using highly concentrated aqueous hydrochloric acid under pressurized hydrogen chloride until the reaction is completed. This may be accomplished by charging an autoclave with a mixture of compound (III) in 36 percent hydrochloric acid (22° Be) and pressurizing the system with hydrogen chloride gas. Alternatively one can also saturate 36% hydrochloric acid with hydrogen chloride at a low temperature, for example, −10°C., and subsequently admix the saturated hydrochloric acid with compound (III) in an autoclave. The reaction mixture contains a minimum of about 36 percent by weight of hydrogen chloride, preferably between 40 percent and 47 percent by weight of hydrogen chloride. The reaction is conducted under a pressure of hydrogen chloride of about 25 psi at a temperature ranging from room temperature to 70°C. over a period of time ranging from 10 hours to 120 hours. Preferably, the reaction is conducted at 35°C. to 50°C. over a period of 10 to 70 hours.

In the process of this invention upon completion of the chlorination the reaction mixture is removed from the autoclave, diluted with water and admixed with a water-immiscible alcohol and a water-immiscible organic solvent. Solvents such as chloroform, ethylene dichloride, or aromatic hydrocarbon solvents such as benzene, toluene, xylene, and hexane, and alcohols such as butyl alcohol or amyl alcohols, and the like, or mixtures thereof, may be used. In the practice of this invention, we have found that a mixture of n-butanol and toluene or xylene is particularly suitable in that the reaction product is more easily handled in situ. The mixture is neutralized with an acid-binding agent, such as alkali hydroxides and carbonates or alkaline earth metal hydroxides, particularly aqueous caustic soda or potassium carbonate or sodium carbonate, at low temperatures, preferably below 20°C., to obtain a pH of about 4.0–6.0. The temperature of the reaction mixture is then raised to about 50°–55°C., at least one molecular equivalent of inorganic base which is based on dl 3-($\beta$-hydroxyphenethyl)-2-iminothiazolidine acid addition salt is slowly added thereto and the reaction mixture is held at about 50°–55°C. from 1 to 8 hours to effect ring closure to compound (VI). The aqueous layer is then removed, reextracted with a solvent such as toluene or ethylene dichloride, and the like, and the extract is combined with the organic solution of compound (VI).

At this point one has several options depending on the particular product desired. If the desired product is dl tetramisole hydrochloride, an alcoholic solution containing excess hydrogen chloride, for example, isopropanolic hydrogen chloride, is added to the solution of compound (VI). The resulting acidified slurry is cooled and stirred at 35°–40°C. then cooled to about 10°C., filtered and washed with isopropyl alcohol and dried to recover dl tetramisole hydrochloride.

If the desired product is the l-tetramisole salt, a resolution process can be inititated at this point by extracting the organic solution with an aqueous solution of resolving agent, such as the mono-sodium salt of d-tosylglutamate, to recover the desired l-tetramisole salt.

The process of this invention results in a much higher overall yield of dl tetramisole hydrochloride from compound (III), about 98 percent overall yield versus the 88 percent yield of the prior art. In addition to the great increase in yield, the process does not require the complicated purification of the prior art because the chlorination step does not produce more than 0.5 percent of the by-product, trans-2-imino-3-styrylthiazolidine. The present process further provides the possibility for easier resolution of dl tetramisole hydrochloride to the more effective l-tetramisole salt.

DETAILED DESCRIPTION

The following examples describe in detail the preparation of intermediates and final product of this invention.

EXAMPLE 1

A 43–45 percent hydrochloric acid solution is prepared by bubbling hydrogen chloride gas into 105 ml. of 36 percent hydrochloric acid (22° Be) at 0°C. The solution is placed in a glass pressure bottle and 60.0 grams of a mixture containing sodium chloride and 39.42 grams of real of dl 3-($\beta$-hydroxyphenethyl)-2-iminothiazolidine hydrochloride is added thereto. The closed pressure bottle is maintained for 36 hours at 35°–37°C. while shaking occasionally to obtain a homogeneous reaction mixture. The pressure bottle is then cooled in ice water and diluted with 130 ml. of water. The reaction mixture is then further diluted with 25 ml. of n-butanol and 30 ml. of toluene. The reaction mixture is neutralized to pH 5–6 while agitating and keeping the temperature below 20°C., using a portion of a mixture of 135 grams of 50 percent aqueous sodium hydroxide and 200 ml. of water. The neutralized mixture is then heated to 50°–55°C. and the remainder of the sodium hydroxide solution is added slowly to maintain the pH of the mixture between 7–8.3. The pH of the mixture is finally adjusted to pH 9.4 by the addition of a small amount of 50 percent aqueous sodium hydroxide solution and the mixture is stirred at 55°C. for an additional 30 minutes. The mixture is cooled to 30°C., allowed to stand until it settles into an upper organic layer and the lower aqueous saline layer. The lower layer is separated, extracted with 100 ml. of toluene and the toluene extract is combined with the upper organic layer. The organic solution is treated at 40°–45°C. by the dropwise addition of a solution of 6.5 grams of hydrogen chloride in 20 ml. of isopropanol while stirring over a period of 20–30 minutes. The resulting slurry is cooled to 10°C. and filtered. The filter cake is washed with isopropanol and the crystalline product is dried at 60°C. to obtain 35.1 grams of dl 6-phenyl-2,3,5,6-tetrahydroimidazo[2,1-b]thiazole hydrochloride, melting point 250°–253.5°C. The product when assayed, shows 3.9 percent unconverted dl 3-($\beta$-hydroxyphenethyl)-2-iminothiazolidine hydrochloride, 0.13 percent sulfated ash and 0.08 percent styryl impurity.

EXAMPLE 2

A 44.5 percent hydrochloric acid solution is prepared by bubbling 16 grams of hydrogen chloride gas into 118.5 grams of 37 percent hydrochloric acid (22° Be) at 0°C. The solution is placed in a glass pressure bottle and 101.0 grams of a mixture containing sodium chloride and 65.7 grams real of dl 3-($\beta$-hydroxyphenethyl)-2-iminothiazolidine hydrochloride compound (III) is added thereto. The closed pressure bottle is maintained for 68 hours at 35°–37°C. while shaking occasionally to obtain a homogeneous reaction mixture. The pressure bottle is then cooled in ice water and diluted with 200 ml. of water. The reaction mixture is further diluted with 34 ml. of n-butanol and 50 ml. of toluene. The reaction mixture is neutralized by the addition of 50 percent sodium hydroxide solution while agitating and keeping the temperature between 15°–20°C. The neutralized mixture is then heated to 50°C. and about 20 grams of 50 percent sodium hydroxide solution is added slowly to maintain the pH of the mixture between 6.8–8.3. The pH of the mixture is finally adjusted to 9.4 by the addition of a small amount of 50 percent aqueous sodium hydroxide solution. The mixture is cooled to 30°C., allowed to stand until it settles into an upper organic layer and a lower aqueous saline layer. The lower layer is separated, extracted with 100 ml. of toluene and the toluene extract is combined with the upper organic layer. The organic solution is treated at 40°–45°C. by the dropwise addition of a solution of 10.0 grams of dry hydrogen chloride in 30 ml. of isopropanol while stirring over a period of 20–30 minutes. The resulting slurry is cooled to 10°C. and filtered. The filter cake is washed with isopropanol and the crystalline product is dried at 60°C. to obtain 59.9 grams (97.8 percent of theory) of dl 6-phenyl-2,3,5,6-tetrahydroimidazo[2,1-b]thiazole hydrochloride melting point 258.7°–260.2°C. The product when assayed showed 0.13 percent styryl impurity.

EXAMPLE 3

A 47 percent hydrochloric acid solution is prepared by saturating 75 ml. of 36 percent hydrochloric acid (22° Be) at −10°C. with hydrogen chloride gas. To this solution is charged dl 3-($\beta$-hydroxyphenethyl)-2-iminothiazolidine hydrochloride (49.17 g; 0.19 mole) and the reaction mixture is held for 22 hours at 45°–47°C. The maximum pressure of hydrogen chloride gas in the autoclave is about 25 psi.

The system is vented, cooled to 25°C. and diluted with 188 ml. of water while holding the temperature below 20°C. Amounts of 27 ml. of n-butyl alcohol and 38 ml. of toluene are charged to the mixture and sufficient 50 percent caustic soda solution is added at below 20°C. to adjust the pH to 2.0. Sufficient 50 percent caustic soda solution or potassium carbonate is added at below 29°C. to adjust the pH to 6.0. The temperature is raised to 50°–55°C. and an amount of 35 percent caustic soda solution or potassium carbonate equivalent to 0.285 mole is added and the mixture is stirred at 50°–55°C. for 2 hours. At the end of this period the aqueous layer is separated and back-extracted with 50 ml. of toluene. The toluene extract is combined with the organic layer containing dl tetramisole base and an additional 25 ml. of toluene is added thereto.

To the solution of dl tetramisole base is charged an 8 percent molar excess of hydrogen chloride as isopropanolic hydrogen chloride, while keeping the temperature below 40°C. The slurry is stirred at 35°–40°C. for about 15 minutes, filtered, washed with 150 ml. of isopropyl alcohol and dried to recover 44.5 grams (97.2 percent yield) dl tetramisole hydrochloride which contains 0.12 percent styryl impurity.

EXAMPLE 4

The preparation of dl 3-($\beta$-hydroxyphenethyl)-2-iminothiazolidineethanol p-toluene sulfonate as disclosed in U.S. Pat. No. 3,478,047 is hereby incorporated by reference. The procedure of Example 3 is followed with the exception that the starting material is dl 3-($\beta$-hydroxyphenethyl)-2-iminothiazolidine p-toluene sulfonate. The yield of dl 6-phenyl-2,3,5,6-tetrahydroimidazo[2,1-]thiazole hydrochloride based on starting material was 88 percent by theory. In a duplicate experiment, the yield was 90 percent of theory.

EXAMPLES 5–10

The process of Example 3 is followed to prepare dl 6-phenyl-2,3,5,6-tetrahydroimidazo[2,1-b]thiazole hydrochloride. The results in Table I show that excellent yields were obtained and the products had a very low percentage of styryl impurity.

TABLE I

Conversion of dl 3-($\beta$-Hydroxyphenethyl)-2-iminothiazolidine Hydrochloride to Compound (VII)

| Example | % of Theory Yield of VII | % Styryl |
|---|---|---|
| 5 | 96.98 | 0.05 |
| 6 | 98.46 | 0.04 |
| 7 | 95.72 | 0.15 |
| 8 | 96.73 | 0.06 |
| 9 | 96.56 | 0.03 |
| 10 | 98.71 | 0.07 |

EXAMPLES 11–18

The process of the prior art involving the non-aqueous chlorination of dl 3-($\beta$-hydroxyphenethyl)-2-iminothiazolidine hydrochloride with thionyl chloride is carried out and the yields and percent styryl impurity obtained are as recorded in Table II. These results on comparison with Table I show that the process of this invention gives significantly higher yields and much lower styryl impurity that the thionyl chloride process.

TABLE II

Conversion of dl 3-($\beta$-Hydroxyphenethyl)-2-iminothiazolidine Hydrochloride to Compound (VII) via Thionyl Chloride Chlorination

| Example | % of Theory Yield of VII | % Styryl |
|---|---|---|
| 11 | 84.47 | 1.35 |
| 12 | 82.01 | 0.26 |
| 13 | 83.33 | 0.31 |
| 14 | 83.90 | 0.37 |
| 15 | 82.39 | 0.76 |
| 16 | 81.34 | 0.28 |
| 17 | 79.36 | 0.55 |
| 18 | 81.63 | 1.21 |

EXAMPLES 19–25

The process of Example 4 is followed to prepare dl 6-phenyl-2,3,5,6-tetrahydroimidazo[2,1-b]thiazole hydrochloride. The results in Table III show that good yields were obtained and the products contained low percentages of styryl impurity.

TABLE III

Conversion of dl 3-(β-Hydroxyphenethyl)-2-iminothiazolidine-p-Toluene Sulfonate to Compound (VII)

| Example | % of Theory Yield of VII | % Styryl |
|---|---|---|
| 19 | 87.9 | 0.12 |
| 20 | 89.6 | 0.26 |
| 21 | 89.5 | 0.15 |
| 22 | 89.3 | 0.07 |
| 23 | 90.5 | 0.18 |
| 24 | 91.1 | 0.14 |
| 25 | 93.2 | 0.11 |

EXAMPLES 26–33

The process of the prior art involving the chlorination of dl 3-(β-hydroxyphenethyl)-2-iminothiazolidine p-toluene sulfonate with thionyl chloride is carried out and the yields and percent styryl impurity obtained are as recorded in Table IV. The results in Table IV on comparison with Table III show that the process of this invention gives significantly higher yields and a much lower styryl impurity than thhe thionyl chloride process.

TABLE IV

Conversion of dl 3-(β-Hydroxyphenethyl)-2-iminothiazolidine p-Toluene Sulfonate to Compound (VII) via Thionyl Chloride Chlorination

| Example | % of Theory Yield of VII | % Styryl |
|---|---|---|
| 26 | 80.20 | 0.31 |
| 27 | 84.23 | 5.26 |
| 28 | 80.18 | 3.55 |
| 29 | 78.05 | 5.34 |
| 30 | 78.85 | 0.09 |
| 31 | 73.47 | 0.18 |
| 32 | 86.65 | 1.00 |
| 33 | 85.78 | 1.00 |

EXAMPLE 34

A laboratory pressure bottle is charged with 50.0 grams of crude dl 3-(β-hydroxyphenethyl)-2-iminothiazolidine hydrochloride (65.54 percent real) and 120 ml. of concentrated hydrochloric acid (37 percent) (22° Be), the bottle is closed and the mixture is heated for 70 hours at 45°–47°C.

The system is cooled to room temperature, vented and diluted with 150 ml. of water while holding the temperature below 20°C. To the reaction mixture is added 20 ml. of n-butyl alcohol, 25 ml. of toluene and sufficient aqueous sodium hydroxide to adjust the pH to 6.0. The temperature is raised to 50°–55°C. and the pH is maintained at 7.5–8.7 by periodic additions of aqueous sodium hydroxide; the pH is finally adjusted to about 9.7. The aqueous layer is separated, reextracted with 80 ml. of toluene and the extract is combined with the original organic phase. The combined organic layers are then acidified with isopropanolic hydrogen chloride to precipitate dl tetramisole hydrochloride. The slurry is filtered, washed with isopropanol and dried to recover 27.1 grams (88.9 percent yield) of dl tetramisole hydrochloride, melting point 259.3°C., which contains 0.17 percent styryl impurity.

We claim:

1. A method of preparing dl 6-phenyl-2,3,5,6-tetrahydroimidazo[2,1-b]thiazole, and acid addition salts thereof, comprising (1) reacting dl 3-(β-hydroxyphenethyl)-2-iminothiazolidine, or an acid addition salt thereof, with a highly concentrated aqueous hydrochloric acid containing 36 to 47 percent by weight of hydrogen chloride under conditions so that the said concentration of hydrogen chloride is maintained, at temperatures of about 25°C. to 70°C. to obtain an acid addition salt of dl 3-(β-chlorophenethyl)-2-iminothiazolidine, and (2) heating the latter compound in the presence of an acid binding agent to obtain dl 6-phenyl-2,3,5,6-tetrahydroimidazo[2,1-b]thiazole or (3) treating the latter compound with an anhydrous acid and recovering the dl 6-phenyl-2,3,5,6-tetrahydroimidazo[2,1-b]thiazole acid addition salt.

2. A method according to claim 1 wherein the ring closure of the acid addition salt of dl 3-(β-chlorophenethyl)-thiazolidine is effected by alkalizing the reaction mixture with an acid-binding agent in the presence of a water-immiscible organic solvent, or mixture of water-immiscible organic solvents.

3. A method for the preparation of dl 6-phenyl-2,3,5,6-tetrahydroimidazo[2,1-b]thiazole, and acid addition salts thereof, comprising the steps of (1) admixing dl 3-(β-hydroxyphenethyl)-2-iminothiazolidine, or in acid addition salt thereof, with a concentrated aqueous solution of hydrochloric acid, containing 36 to 47 percent by weight of hydrogen chloride under conditions so that the said concentration of hydrogen chloride is maintained, (2) reacting the mixture under pressure between room temperature and 70°C. for a period of 10 hours to 120 hours, (3) adding water, a suitable water-immiscible organic solvent, or mixture or water-immiscible organic solvents, (4) adding an inorganic acid-binding agent, or agents, to said reaction mixture to ring close the dl 3-(β-chlorophenethyl)-2-iminothiazolidine acid addition salt to form dl 6-phenyl-2,3,5,6-tetrahydro[2,1-b]thiazole, (5) separating the organic phase from the reaction mixture, and precipitating dl 6-phenyl-2,3,5,6-tetrahydroimidazo[2,1-b]thiazole or (6) acidifying the organic phase with an anhydrous acid to form a dl 6-phenyl-2,3,5,6-tetrahydroimidazo[2,1-b]thiazole acid addition salt, and (7) separating the precipitated dl 6-phenyl-2,3,5,6-tetrahydroimidazo[2,1-b]thiazole acid addition salt.

4. A method according to claim 3 wherein the acid addition salt of step (1) is dl 3-(β-hydroxyphenethyl)-2-iminothiazolidine hydrochloride and the concentrated aqueous hydrochloric acid solution is at least 36 percent (22° Be) solution.

5. A method according to claim 3 wherein the acid addition salt of step (1) is dl 3-(β-hydroxyphenethyl)-2-iminothiazolidine p-toluene sulfonate and the concentrated aqueous hydrochloric acid is at least 36 percent (22° Be) solution.

6. A method according to claim 3 wherein the reaction mixture of step (2) is pressurized with hydrogen chloride gas to obtain substantially up to about 48 percent hydrochloric acid and reacting between room temperature and 70°C. for a period of about 10 hours to 120 hours.

7. A method according to claim 3 wherein the reaction mixture of step (3) is admixed with water, an aromatic hydrocarbon and a water-immiscible alcohol.

8. A method according to claim 3 wherein the inorganic acid-binding agent of step (4) is an alkaline earth metal hydroxide, alkali metal hydroxide or alkali metal carbonate.

9. A method according to claim 3 wherein the acid of step (6) is hydrogen chloride.

* * * * *

UNITED STATES PATENT OFFICE
CERTIFICATE OF CORRECTION

PATENT NO. : 3,890,341
DATED : June 17, 1975
INVENTOR(S) : John Edson Gordon and Imre Aurel Halmos It is certified that error appears in the above-identified patent and that said Letters Patent are hereby corrected as shown below:

In the ABSTRACT, lines 1, 3, 6, 8 and 10 thereof, "di" should be -- dl --.

Column 8, line 17, "[2,1-]" should read -- [2,1-b] --.

Column 9, line 24, "thhe" should read -- the --.

Signed and Sealed this twenty-eight Day of October 1975

[SEAL]

Attest:

RUTH C. MASON
Attesting Officer

C. MARSHALL DANN
Commissioner of Patents and Trademarks